(12) United States Patent
Neerincx et al.

(10) Patent No.: US 8,909,863 B2
(45) Date of Patent: Dec. 9, 2014

(54) CACHE FOR STORAGE AND/OR RETRIEVAL OF APPLICATION INFORMATION

(75) Inventors: Matthew A. Neerincx, Sammamish, WA (US); Zlatko V. Michailov, Redmond, WA (US); Chadwin J. Mumford, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 999 days.

(21) Appl. No.: 12/618,787

(22) Filed: Nov. 16, 2009

(65) Prior Publication Data

US 2011/0119449 A1 May 19, 2011

(51) Int. Cl.
*G06F 12/00* (2006.01)
*G06F 12/08* (2006.01)
*G06F 12/14* (2006.01)

(52) U.S. Cl.
CPC ........ *G06F 12/0802* (2013.01); *G06F 12/1458* (2013.01)
USPC ................... 711/118; 711/133; 711/E12.001; 711/E12.022; 719/312

(58) Field of Classification Search
USPC .................. 711/133, 118, E12.001, E12.022; 719/312
See application file for complete search history.

(56) References Cited

U.S. PATENT DOCUMENTS

| | | | |
|---|---|---|---|
| 5,835,908 A | 11/1998 | Bennett et al. | |
| 6,073,139 A * | 6/2000 | Jain et al. | 1/1 |
| 6,256,636 B1 * | 7/2001 | Choy | 707/610 |
| 7,089,356 B1 | 8/2006 | Chen et al. | |
| 7,831,604 B2 * | 11/2010 | Britton et al. | 707/755 |
| 2004/0181533 A1 * | 9/2004 | Santosuosso | 707/10 |
| 2004/0193574 A1 * | 9/2004 | Suzuki | 707/2 |
| 2006/0031760 A1 * | 2/2006 | Jacobs | 715/517 |
| 2007/0136360 A1 * | 6/2007 | Randall et al. | 707/102 |
| 2008/0104390 A1 * | 5/2008 | VanHeyningen et al. | 713/151 |
| 2008/0104686 A1 * | 5/2008 | Erickson | 726/7 |
| 2008/0140937 A1 * | 6/2008 | Nalawade et al. | 711/119 |
| 2011/0060724 A1 * | 3/2011 | Chan | 707/683 |

OTHER PUBLICATIONS

"Oracle Application Server", Retrieved at<<http://download.oracle.com/docs/cd/B31017_01/migrate.1013/b25219.pdf>> Feb. 2007, pp. 64.
"GemFire Data Fabric: High Performance, Distributed Main-memory Data and Events Platform", Retrieved at <<http://community.gemstone.com/download/attachments/4752318/GemFire+Data+Fabric+-+Technical+White+paper.pdf?version=1>> 2009, pp. 1-24.
"Design and Implementation Guidelines for Web Clients", Retrieved at <<http://msdn.microsoft.com/en-us/library/ms978622.aspx>> Nov. 2003, pp. 1-18.
Whirlycott, Seth, "Whirlycache 1.0.1", Retrieved at <<http://www.softpedia.com/get/Programming/Other-Programming-Files/Whirlycache.shtml>> Sep. 15, 2009, pp. 1-2.
"Distributed Filesystem with Hash Link to Implement the Cache", Retrieved at <<http://filesystewithhash.codeplex.com/>> Last Edited Dec. 16, 2008, pp. 1-2.
Luck, Greg, "The Role of Caching in Large Scale Architecture", Retrieved at <<http://java.dzone.com/articles/role-caching-large-scale>> Last Comment on Jun. 18, 2009, pp. 1-6.

\* cited by examiner

*Primary Examiner* — Mardochee Chery
(74) *Attorney, Agent, or Firm* — Nicholas Chen; Kate Drakos; Micky Minhas

(57) ABSTRACT

A request for application information can be received from an application running in a process. The application information can be requested from an information repository, and received back from the repository in a first format. The application information can be converted to a second format, and passed to the application in the second format. In addition, the application information can be saved in the second format in a cache in the process. Also, when application information has been cached in response to a request for the information for a first user object, and a subsequent request for the application information for a second user object is received, it can be determined whether the second user object is authorized to access the application information. If so, then the application information can be fetched from the cache and returned for use by the second user object.

20 Claims, 6 Drawing Sheets

US 8,909,863 B2

CACHE FOR STORAGE AND/OR RETRIEVAL OF APPLICATION INFORMATION

BACKGROUND

Applications often read application information (i.e., information used by applications) stored in local and remote stores. Fetching and processing this application information can take a considerable amount of time, especially when it is fetched from remote stores. Likewise, attempts to fetch the information from remote stores can fail intermittently due to poor network conditions. Accordingly, some systems store application information in local caches to reduce such failures, and to reduce time spent fetching application information. Some such caches are in-process caches, which are located in a process in which an application is running, or in other words the caches are in the memory space allocated for the associated application process.

SUMMARY

Whatever the advantages of previous application information caching tools and techniques, they have neither recognized the application information caching tools and techniques described and claimed herein, nor the advantages produced by such tools and techniques. The application information caching tools and techniques described herein can allow application information caches to be used more effectively, such as by maintaining cached information in an enhanced format that is different from the format in which the information is stored, and/or effectively honoring access rights when access to the same cached information is requested for multiple user objects. A user object can be an object representing a user or group of users (e.g., an object associated with a login name or username), or representing some other entity, such as a company or a particular computing resource. As an example, information may be requested for a user object when a module requests the information while the module is running for a user object (e.g., when a user is logged in with the user object).

In one embodiment, the tools and techniques can include receiving a request for application information from an application running in a process. The application information can be requested from an information repository, and received back from the repository in a first format. The application information can be converted to a second format, and passed to the application in the second format. In addition, the application information can be saved in the second format in a cache in the process.

In another embodiment of the tools and techniques, a request for application information can be received, and it can be determined whether the application information is in a cache. If the application information is not in the cache, then the application information can be requested, received in a first format, converted from the first format to a second format, stored in the cache in the second format, and returned in the second format in a response to the request. If the application information is in the cache, then the application information can be retrieved from the cache and returned in a response to the request.

In yet another embodiment of the tools and techniques, a request for application information can be received from a module running for a user object. In response to the request, it can be determined whether an instance of the application information is in a cache. If an instance of the application information is in the cache, then it can be determined whether the instance of the application information in the cache has already been accessed for the user object. Application information in a cache can be considered to be the same "instance" if it is considered to be the same under applicable access management rules. For example, application information may be updated in a refresh operation and still be considered the same instance if the access management properties for the application information have not changed in a way that would affect a user object's access rights to the information. If the instance of the application information in the cache has not already been accessed for the user object, then it can be determined whether the user object is authorized to access the application information, and if the user object is authorized to access the application information then the application information can be retrieved from the cache and passed to the module.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for improved application information caching. Such improvements may result from the use of various techniques and tools separately or in combination.

Such techniques and tools may include converting the application information from a format in which it is stored to another application-friendly format that can be used more effectively by the application. The application information can be stored in the cache in the application-friendly format so that the application does not need to re-convert the application information each time the information is fetched from the cache.

The tools and techniques can also include ways of using an application information cache, while maintaining access control limitations on the application information. For example, when application information has been cached in response to a request for a first user object, and a subsequent request for the application information for a second user object is received, it can be determined whether the second user object is authorized to access the application information. If the second user object is authorized to access the application information, then the application information can be fetched from the cache and returned for use by the second user.

Accordingly, user access limitations to application information can be maintained without having to re-fetch the information from an information repository.

Accordingly, one or more substantial benefits can be realized from the application information caching tools and techniques described herein. However, the subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. Moreover, for the sake of simplicity, flowcharts may not show the various ways in which particular techniques can be used in conjunction with other techniques.

I. Exemplary Computing Environment

Figure 1:
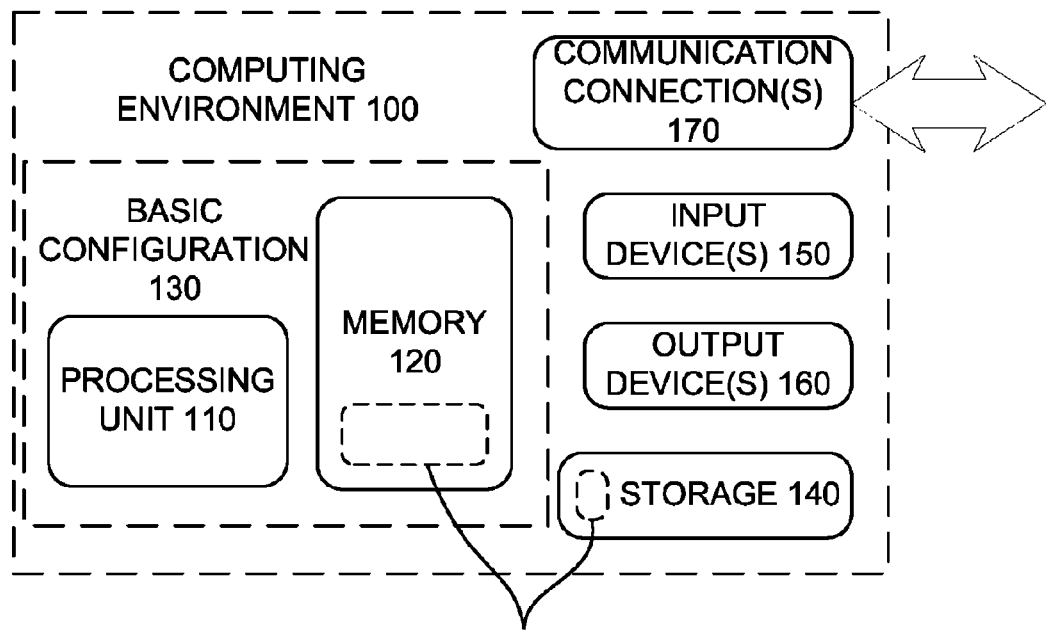
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as an environment for an application information cache with format conversion and access control tools and techniques. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, phase change memory), or some combination of the two. The memory (120) stores software (180) implementing an application information cache with format conversion and/or application information access control.

Although the various blocks of FIG. 1 are shown with lines for the sake of clarity, in reality, delineating various components is not so clear and, metaphorically, the lines of FIG. 1 and the other figures discussed below would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," "computing device," and similar terms.

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Application Information Cache System and Environment

Figure 2:
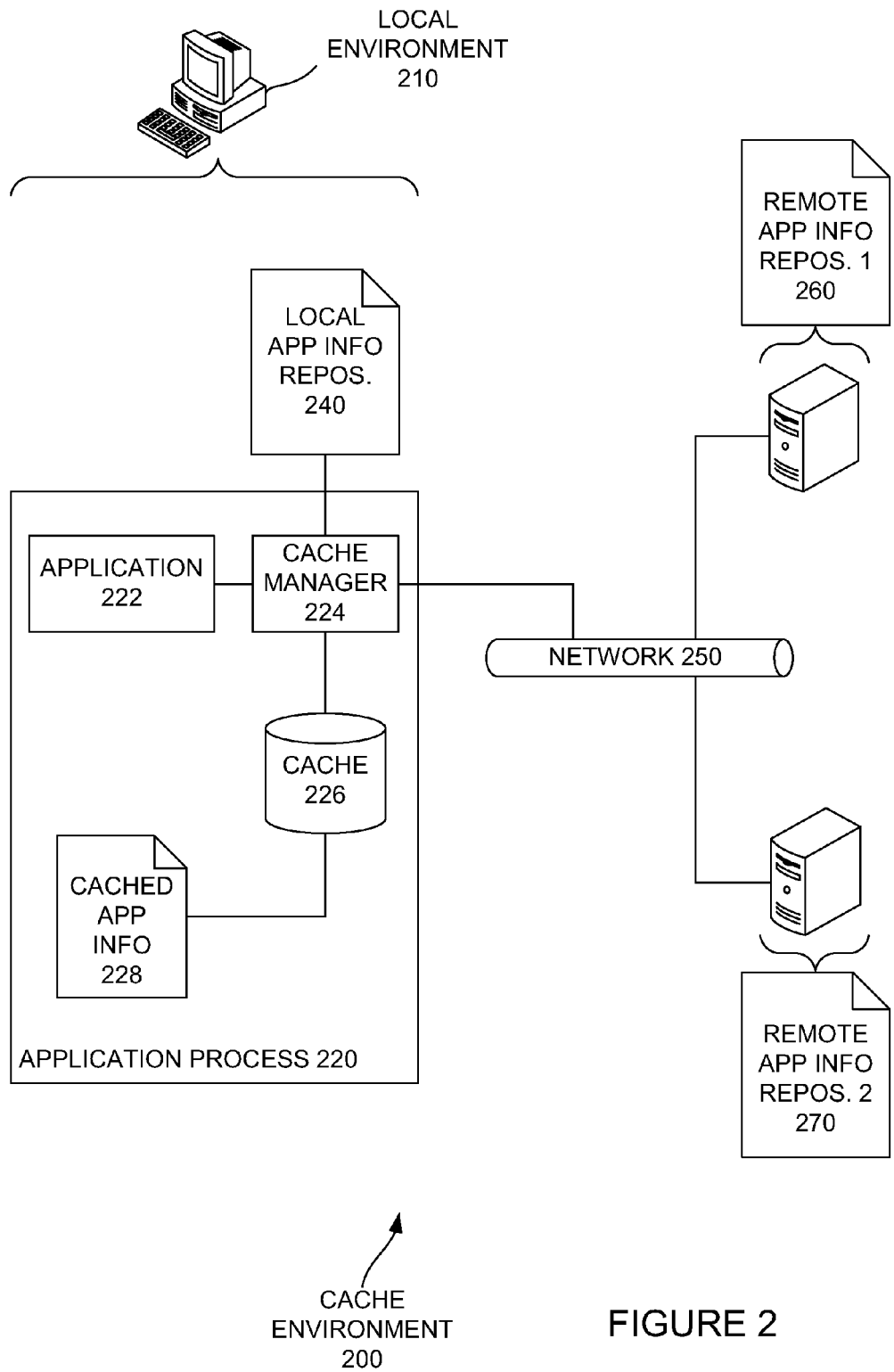
FIG. 2 is a schematic diagram of a cache environment.

FIG. 2 is a schematic diagram of a cache environment (200) in conjunction with which one or more of the described embodiments may be implemented. The cache environment (200) can include a local environment (210), which can have computing components similar to those described above with reference to the computing environment (100) of FIG. 1. The local environment (210) can host an application process (220), and an application (222) can run in the process (220). A cache manager (224) can also be running in the application process (220), although the cache manager (224) could run outside the application process (220). The cache manager (224) can interact with a cache (226) to store cached application information (228) in and retrieve cached application information (228) from the cache (226). The cache (226) can also be in the same application process (220) as the application (222), although in some embodiments the cache (226) may be outside the application process (220). For example, in some embodiments, the cache (226) and the cache manager (224) may be in some other process in the local environment (210).

The cache manager (224) can also interact with a local application information repository (240) in the local environment (210) to retrieve application information, and can interact over a network (250) to retrieve application information from a first remote application information repository (260) and a second remote application information repository (270). Labeling of items and/or actions such as the remote information repositories (260) and (270) as "first" and "second" is done for clarity, and should not be taken to imply an order of timing, priority, or some other order. The network can be any of various different types of networks, including different types of local area networks, wide area networks, and global networks. The cache manager (224) can interact with the repositories (240, 260, and 270) in standard ways, such as by sending network requests such as HTTP requests to the remote application information repositories (260 and 270), and sending read requests down a standard storage stack in the local environment (210) to the local application information repository (240). Various different configurations of repositories could be included in the cache environment (200), such as configurations with only a single application information repository, with multiple local application information repositories, with only remote application information repositories, etc.

Application information may be stored in the application information repositories in multiple different formats. For example, the application information may be stored in a different format in each of the application information repositories (240, 260, and 270). Also, a single application information repository (240, 260, or 270) may store application information in multiple formats. The cache manager (224) can convert the application information from those different formats to a cache/application format, such as a format that is efficient for storing the information in the cache (such as a compressed format) and that is efficient for use by the application (such as a format that is converted from a format that the application cannot use to one that the application can use, or from a format that the application cannot efficiently use to one that the application can efficiently use).

Figure 3:
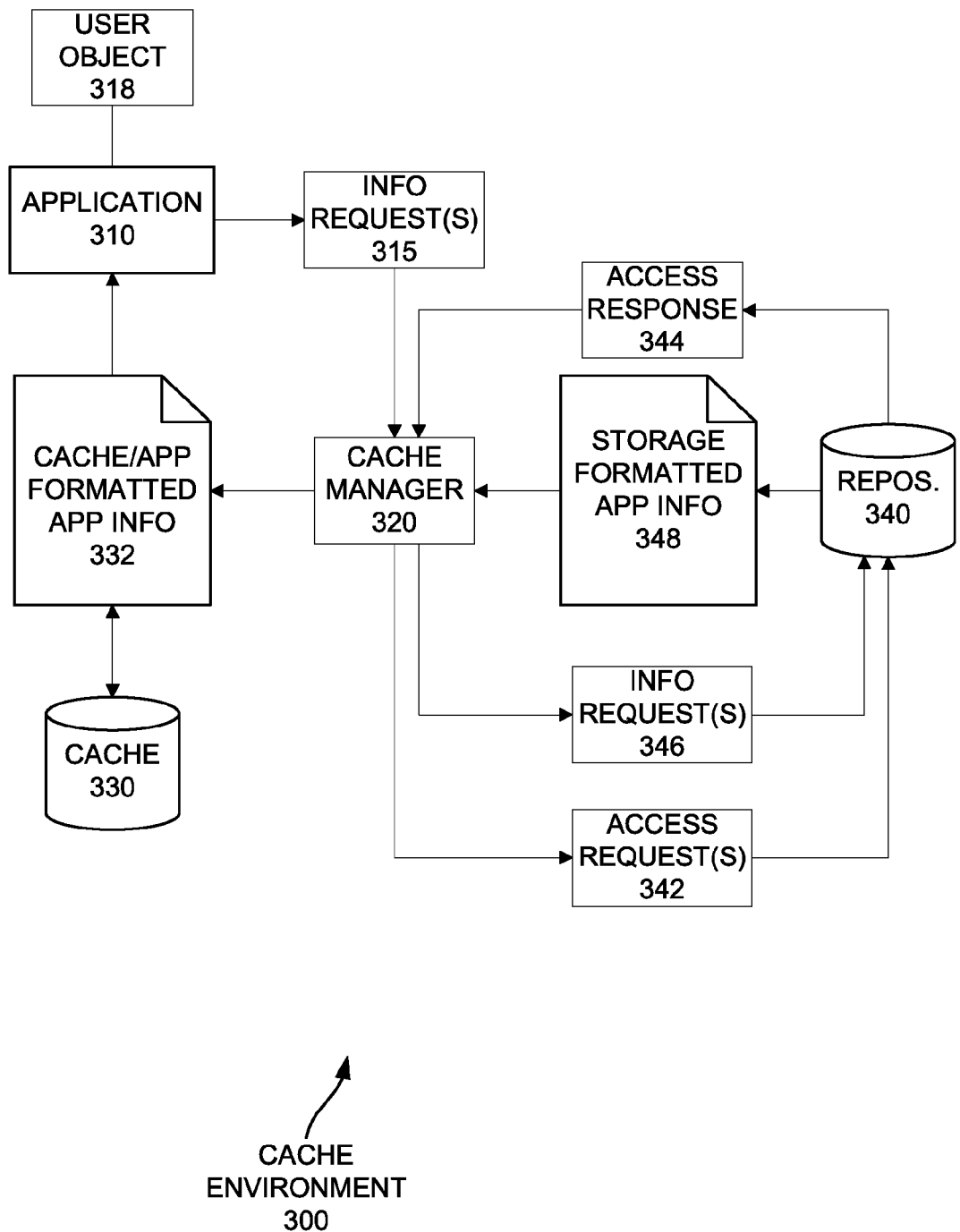
FIG. 3 is another schematic diagram of a cache environment.

Referring now to FIG. 3, communications between components of a cache environment (300) will be discussed. The cache environment (300) is illustrated and discussed in simplified form, but may include components similar to those discussed above with reference to the environments of FIGS. 1-2. In the cache environment (300), an application (310) can send an information request (315) to the cache manager (320), requesting a set of application information. For example, the application (310) may pass a uniform resource locator (URL) to the cache manager (320) to specify a storage repository, and to specify the requested application information within the repository. The request (315) may be for application information for a user object (318). The application (310) may be running for multiple user objects in the same process at the synchronously or asynchronously. For example, the application (310) may have multiple threads running for multiple user objects in the same process.

In response to receiving the information request (315), the cache manager (320) can determine whether the requested information is already stored in an associated cache (330). If so, and if the user object (318) for which the request (315) was sent has already accessed the information, then the cache manager (320) can fetch the cache/application formatted application information (332) from the cache (330). The cache/application format can be a format that can be efficiently used by the application (310), and that can be efficiently stored in the cache (330). The cache manager (320) can pass the cache/application formatted application information (332) to the application (310).

If the cache manager (320) determines that the requested application information is stored in the cache (330), but the user object (318) for which the request (315) was sent has not yet accessed the requested information, the cache manager (320) can determine whether the user object (318) is authorized to access the requested information, such as by sending an inquiry to an application information repository (340) where the application information is stored. For example, the cache manager (320) can send an access request (342), which can identify the user object (318) and inquire whether the user object (318) is authorized to access the requested application information. The repository (340) can respond with an access response (344), indicating whether the user object (318) is authorized to access the application information. If the access response (344) indicates that the user object (318) is not authorized to access the requested information, then the cache manager (320) can refuse to provide the requested information. The cache manager (320) may also take other appropriate action, such as sending an access denial message to the application (310) and/or triggering an error message to be displayed at a user interface.

If the access response (344) indicates that the user object (318) is authorized to access the requested information, then the cache manager can fetch the requested information in the form of cache/application formatted application information (332) from the cache (330) and pass the cache/application formatted application information (332) to the application (310). In this way, the user object (318) can be granted access to the requested information and can receive that information, without the information itself having to be sent from the repository (340). This technique for supplying application information can thus honor access limitations, while saving system resources and time as compared to actually requesting a new instance of the requested information from the repository (340).

If after receiving the request (315), the cache manager (320) finds that the requested information is not currently stored in the cache (330), then the cache manager (320) can send an application information request (346) to the application information repository (340). For example, the cache manager (320) may parse the information request (315) received from the application (310), and send an information request (346) to the information repository (340), using the information from the request (315) received from the application (310). For example, if the request (315) from the application (310) includes a URL, the cache manager (320) can parse the URL and then send the information request (346), using the URL to locate the requested application information. As noted above, the URL may point to a remote repository or a local repository.

If access to the requested information is limited, then in response to receiving the information request (346), the repository (340) can determine whether the user object (318) for which the information is requested has authorization to access the information. If not, then the repository (340) can respond to the information request (346) with an access response (344), indicating that the user object (318) is not authorized to access the requested information. The cache manager (320) can then take appropriate action in response to being informed that the user object (318) is not authorized, as discussed above.

If access to the requested information is not limited, or if the user object (318) is authorized to access the information, the repository can respond to the information request (346) by sending the requested application information in the form of storage formatted application information (348). The storage format may be any of multiple formats that the cache manager (320) and/or the application are configured to handle, such as XML files, ordinary text files, HTML files, database objects such as database tables, etc.

Upon receiving the storage formatted application information (348), the cache manager (320) can convert that information (348) into cache/application formatted application information (332). The cache/application format can be a format that is more efficient than the storage format for storing in the cache (330) and/or for use by the application (310). For example, the cache/application formatted application information (332) may be compressed. Also, applications often convert application information from a standard storage format to a format that is more usable by one or more components of the application. This conversion can be done by the cache manager (320), and the cache manager (320) can also store the more application-friendly and cache-friendly formatted application information (332) in the cache (330) and pass the information (332) to the application (310). As one example, the conversion may only extract a portion of the storage formatted application information (348), such as where the application (310) will only use that portion of the information. As another example, the conversion may convert a yes-or-no field into a single bit, such as a bit that can represent a "yes" as a 1, and a "no" as a 0. Many other specific formatting conversions may be done by the cache manager (320), such as formatting conversions that are currently done by applications when receiving application information in a storage format and converting the information to a more application-friendly format. While for the sake of clarity and discussion the cache manager (320) is not discussed or illustrated herein as being part of the application (310), it may be specifically programmed to interact with the specific application (310), and it may be packaged with the application (310), installed on machines along with the application (310), etc. Alternatively, the cache manager (320) may be supplied separately from the application (310).

The next time the application (310) needs that same information, the cache manager (320) can supply it from the cache (330) without needing to convert the format again. Because the cache/application formatted application information (332) can be fetched from the cache (330) and supplied to the application (310) without being re-converted, time and resources can be saved. This savings can be substantial when dealing with information that is used frequently by the application (310). Also, because the cache manager (320) can retrieve the requested information and convert it to an application-friendly format, the application (310) may not even need to know whether the repository is local or remote, or be familiar with the storage format for the application information.

The cache manager (320) can also automatically refresh the cached data after a period of time that may be configurable by a user. For example, the cache manager (320) can track elapsed time, and can periodically trigger an automatic refresh operation, which can include determining whether the application information in the cache is out of date. For example, this may be done by sending a request to the repository (340) for time stamp information. The repository (340) can respond with time stamp information for the current version of the application information in the repository (340). The cache manager (320) can compare the time stamp information received from the repository (340) with time stamp information for the version of the application information currently stored in the cache (330). If the application information is out of date, then the cache manager (320) can send an information request (346) to the repository (340) for updated application information. The repository (340) can respond by sending updated storage formatted application information (348) back to the cache manager (320). The cache manager (320) can convert the updated storage formatted application information (348) into cache/application formatted application information (332) can store that updated information (332) in the cache (330). Other alternative techniques may be used for automatically refreshing cached information. For example, the cache manager (320) may send to the repository (340) time stamp information for the version of the application information in the cache (330), and allow the repository (340) to determine whether the cached information is out of date, and whether to return updated storage formatted application information (348) back to the cache manager (320).

The refresh operation may be performed asynchronously with other cache operations. For example, the refresh operation may be performed on a background thread in parallel with the cache manager (320) fulfilling one or more information requests (315) from an application (310), even if those requests are for the same application information that is being refreshed. Additionally, the cache manager (320) may fulfill multiple information requests (315) from the application (310) asynchronously so that multiple requests (315) can be fulfilled by the cache manager (320) in parallel.

III. Application Information Cache Techniques

Figure 4:
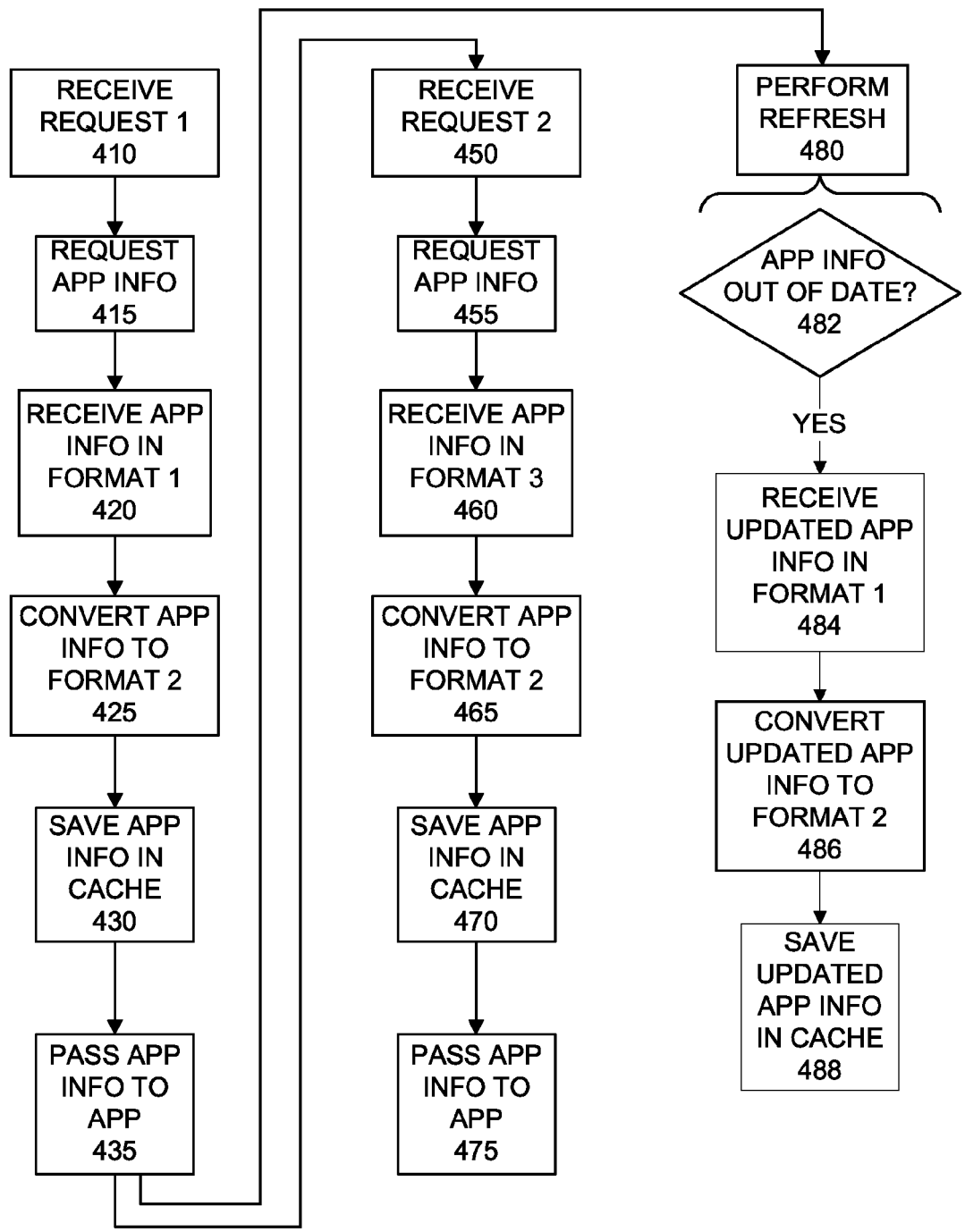
FIG. 4 is a flowchart illustrating an application information caching technique.

Referring to FIG. 4, an application information caching technique will be discussed. In the technique, a first request for application information can be received (410) from an application running in a process. In response, the application information can be requested (415) from an information repository. The application information can be received (420) from the information repository in the first format, and can be converted (425) from the first format to a second format. The application information can be saved (430) in the second format in a cache in the same process in which the application is running. The application information can also be passed (435) to the application in the second format.

Multiple information requests may be received from the application for different application information, which may be in different storage formats, and those requests may be processed asynchronously. For example, a second request for a second set of application information can be received (450). In response, the second set of application information can be requested (455) from a second information repository or from the same information repository, and the second set of application information can be received (460) in a third format from the requested information repository. The second set of application information can be converted (465) from the third format to the second format, and can be saved (470) in the cache in the second format. The second set of application information can be passed (475) to the application in the second format.

The technique can also include performing (480) a refresh operation. The refresh operation can include determining (482) whether the first set of application information in the cache is out of date. If the first set of application information in the cache is out of date (such as where the corresponding information in the repository has been modified but the information in the cache has not), then updated application information can be received (484) in the first format from the information repository that originally provided the application information. The updated application information can be converted (486) from the first format to the second format, and saved (488) in the second format in the cache.

Converting application information can include compressing the information. The application may be configured to use the application in the second format, but not in the first format. Additionally, the application may be configured to use the application information more efficiently (such as by processing the application information more quickly) in the second format than in the first format.

Figure 5:
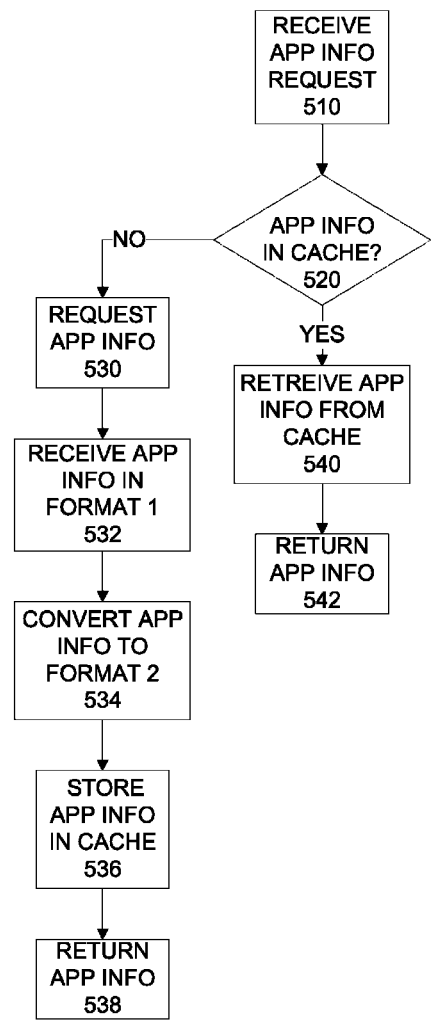
FIG. 5 is a flowchart illustrating another application information caching technique.

Referring now to FIG. 5, another application information caching technique will be discussed. The technique can include receiving (510) a request for application information. It can be determined (520) whether the application information is in a cache. If the application information is not in the cache, then the application information can be requested (530), received (532) in a first format, converted (534) from the first format to a second format, stored (536) in the cache in the second format, and returned (538) in a response to the request. If the application information is in the cache, then the technique can include retrieving (540) the application information from the cache and returning (542) the application information in a response to the request. For example, the application information can be retrieved (540) in the second format, and returned (542) in the second format.

The technique of FIG. 5 can also be repeated for additional requests for additional sets of application information. Even if those requests are for application information stored in a third format, the application information can be converted to the second format, stored in the cache in the second format, and returned in a response in the second format. If additional requests are for sets of information already in the cache, those sets can be retrieved from the cache in the second format, and returned in the second format.

The first and the additional requests may be received from an application running in a process, and the cache can also be in that process. Additionally, the requests may be for information in different information repositories (first and second information repositories, etc.).

Figure 6:
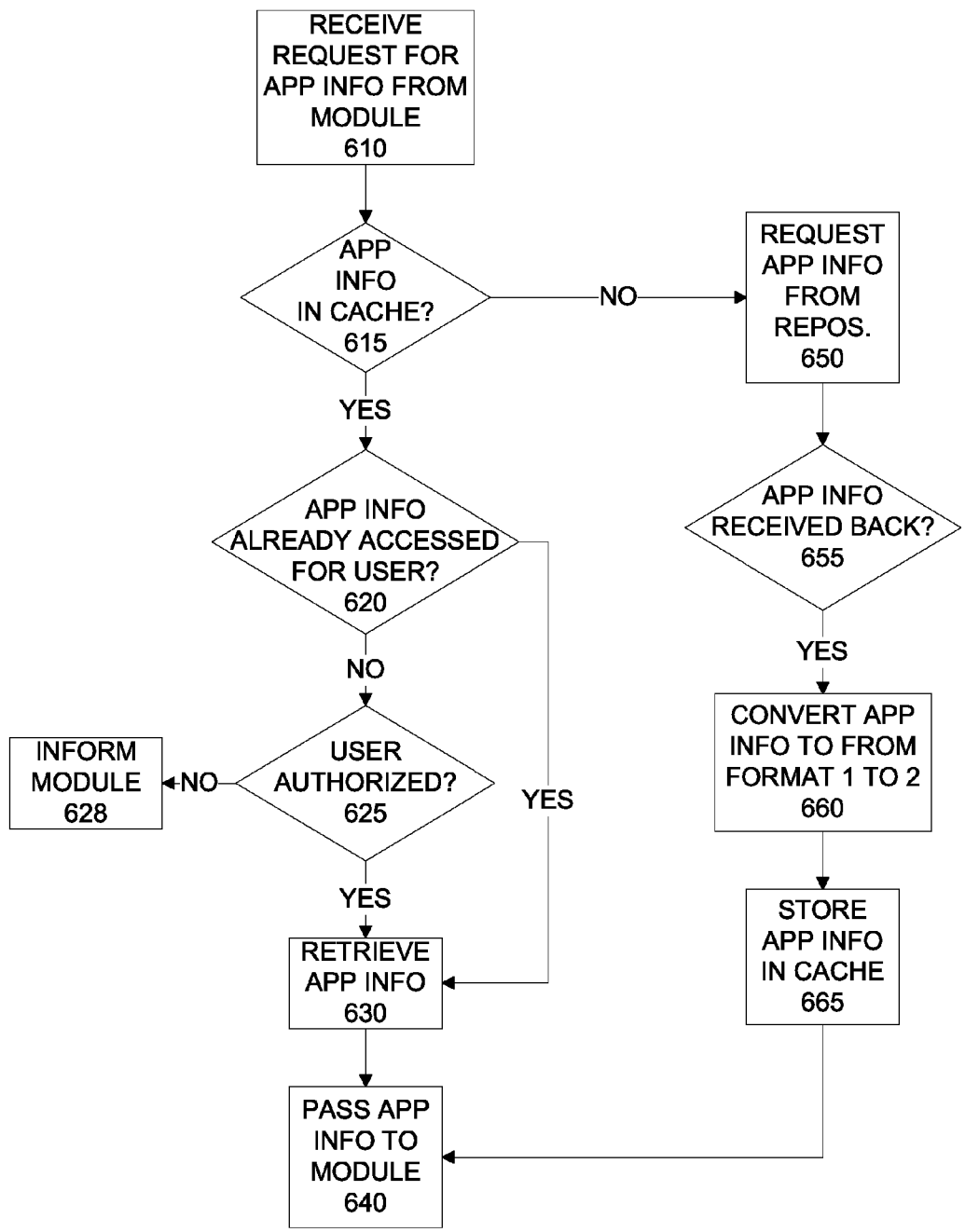
FIG. 6 is a flowchart illustrating yet another application information caching technique.

Referring now to FIG. 6, another application information caching technique will be discussed. In the technique, a request for application information can be received (610) from a module running for a user object. In response to the request, it can be determined (615) whether an instance of the application information is in a cache. If so, then it can be determined (620) whether the instance of the application information in the cache has already been accessed for the user object. If the instance of the application information in the cache has not already been accessed for the user object, then the technique can include determining (625) whether the user object is authorized to access the application information. This determination (625) can include sending an inquiry to an information repository that stores the application information. If the user object is not authorized to access the application information, then the module can be informed (628) that the user object is not authorized to access the application information. If it is determined (625) that the user object is authorized, or if it is determined (620) that the instance of the application information in the cache was already accessed from the cache for the user object, then the application information can be retrieved (630) from the cache and passed (640) to the module.

If it is determined (615) that an instance of the application information is not in the cache, then the technique can further include requesting (650) the application information from an information repository. It can be determined (655) whether the application information is received back from the information repository in response to requesting the application information. If so, the technique can further include converting (660) the application information from a first format to a second format, storing (665) an instance of the application information in the cache in the second format, and passing (640) the application information to the module in the second format.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. One or more computer-readable storage media having computer-executable instructions embodied thereon that, when executed by at least one processor, cause the at least one processor to perform acts comprising:
   retrieving application information from an information repository;
   storing an instance of the application information in a cache;
   receiving a request for the application information from a module running for a user object;
   in response to the request, determining that the instance of the application information is in the cache;
   in response to determining that the instance of the application information is in the cache, determining that the instance of the application information in the cache has not already been accessed for the user object;
   in response to determining that the instance of the application information in the cache has not already been accessed for the user object, performing the following:
   determining that the user object is authorized to access the application information; and in response to determining that the user object is authorized to access the application information, retrieving the already-stored instance of the application information from the cache and passing the application information to the module.

2. The one or more computer-readable storage media of claim 1, wherein, the application information is a first set of application information, the request for application information is a first request for the first set of application information, and the acts further comprise the following:
   receiving a second request for a second set of application information from the module running for the user object;
   in response to the second request, determining that an instance of the second set of application information is in the cache;
   in response to determining that the instance of the second set of application information is in the cache, determining that the instance of the second set of application information in the cache has already been accessed for the user object; and
   in response to determining that the instance of the second set of application information in the cache has already been accessed for the user object, retrieving the application information from the cache and passing the application information to the module.

3. The one or more computer-readable storage media of claim 1, wherein determining that the user object is authorized to access the application information comprises sending an inquiry to the information repository.

4. The one or more computer-readable storage media of claim 1, wherein, the application information is a first set of application information, the request for application information is a first request for the first set of application information, and the acts further comprise:
   receiving a second request for a second set of application information from the module running for the user object;
   in response to the second request, determining that an instance of the second set of application information is not in the cache; and
   in response to determining that an instance of the application information is not in the cache, requesting the application information from the information repository.

5. The one or more computer-readable storage media of claim 4, wherein the acts further comprise the following:
   in response to the second request, receiving the second set of application information back from the information repository;
   in response to receiving the second set of application information back from the information repository, converting the second set of application information from a first format to a second format, the second format being different from the first format;
   storing an instance of the second set of application information in the cache in the second format; and
   passing the second set of application information to the module in the second format.

6. The one or more computer-readable storage media of claim 1, wherein, the application information is a first set of application information, the request for application information is a first request for the first set of application information, and the acts further comprise the following:
   receiving a second request for a second set of application information from the module running for the user object;
   in response to the second request, determining that an instance of the second set of application information is in the cache;
   in response to determining that the instance of the second set of application information is in the cache, determining that the instance of the second set of application information in the cache has not already been accessed for the user object;
   in response to determining the instance of the second set of application information in the cache has not already been accessed for the user object, determining that the user object is not authorized to access the second set of application information; and
   in response to determining that the user object is not authorized to access the second set of application information, informing the module that the user object is not authorized to access the second set of application information.

7. A computer system comprising:
   at least one processor; and
   a memory comprising instructions stored thereon that when executed by the at least one processor cause the at least one processor to perform acts comprising:
      retrieving application information from an information repository;
      storing an instance of the application information in a cache;
      receiving a request for the application information from a module running for a user object;
      in response to the request, determining that the instance of the application information is in the cache;
      in response to determining that the instance of the application information is in the cache, determining that the instance of the application information in the cache has not already been accessed for the user object;
      in response to determining that the instance of the application information in the cache has not already been accessed for the user object, performing the following:
         determining that the user object is authorized to access the application information from the information repository; and
         in response to determining that the user object is authorized to access the application information from the information repository, retrieving the already-stored instance of the application information from the cache and passing the application information to the module.

8. The computer system of claim 7, wherein, the application information is a first set of application information, the request for application information is a first request for the first set of application information, and the acts further comprise the following:
   receiving a second request for a second set of application information from the module running for the user object;
   in response to the second request, determining that an instance of the second set of application information is in the cache;
   in response to determining that the instance of the second set of application information is in the cache, determining that the instance of the second set of application information in the cache has already been accessed for the user object; and
   in response to determining that the instance of the second set of application information in the cache has already been accessed for the user object, retrieving the application information from the cache and passing the application information to the module.

9. The computer system of claim 7, wherein determining that the user object is authorized to access the application information comprises sending an inquiry to the information repository.

10. The computer system of claim 7, wherein, the application information is a first set of application information, the request for application information is a first request for the first set of application information, and the acts further comprise:
   receiving a second request for a second set of application information from the module running for the user object;
   in response to the second request, determining that an instance of the second set of application information is not in the cache; and
   in response to determining that an instance of the application information is not in the cache, requesting the application information from the information repository.

11. The computer system of claim 10, wherein the acts further comprise the following:
   in response to the second request, receiving the second set of application information back from the information repository;
   in response to receiving the second set of application information back from the information repository, converting the second set of application information from a first format to a second format, the second format being different from the first format;
   storing an instance of the second set of application information in the cache in the second format; and
   passing the second set of application information to the module in the second format.

12. The computer system of claim 7, wherein, the application information is a first set of application information, the request for application information is a first request for the first set of application information, and the acts further comprise the following:
   receiving a second request for a second set of application information from the module running for the user object;
   in response to the second request, determining that an instance of the second set of application information is in the cache;
   in response to determining that the instance of the second set of application information is in the cache, determining that the instance of the second set of application information in the cache has not already been accessed for the user object;
   in response to determining the instance of the second set of application information in the cache has not already been accessed for the user object, determining that the user object is not authorized to access the second set of application information; and
   in response to determining that the user object is not authorized to access the second set of application information, informing the module that the user object is not authorized to access the second set of application information.

13. A computer-implemented method, comprising:
   retrieving application information from an information repository;
   storing an instance of the application information in an in-process cache in a process in which at least a portion of the application is running;
   receiving a request for the application information from a computer application running for a computer-readable user object;
   in response to the request, determining that the instance of the application information is in the in-process cache;
   in response to determining that the instance of the application information is in the cache, determining that the instance of the application information in the cache has not already been accessed for the user object;
   in response to determining that the instance of the application information in the cache has not already been accessed for the user object, performing the following:
      determining that the user object is authorized to access the application information; and
      in response to determining that the user object is authorized to access the application information, retrieving the already-stored instance of the application information from the cache and passing the application information to the application.

14. The method of claim 13, wherein, the application information is a first set of application information, the request for application information is a first request for the first set of application information, and the method further comprises the following:
   receiving a second request for a second set of application information from the application running for the user object;
   in response to the second request, determining that an instance of the second set of application information is in the cache;
   in response to determining that the instance of the second set of application information is in the cache, determining that the instance of the second set of application information in the cache has already been accessed for the user object; and
   in response to determining that the instance of the second set of application information in the cache has already been accessed for the user object, retrieving the application information from the cache and passing the application information to the application.

15. The method of claim 13, wherein determining that the user object is authorized to access the application information comprises sending an inquiry to the information repository.

16. The method of claim 13, wherein, the application information is a first set of application information, the request for application information is a first request for the first set of application information, and the method further comprises:
   receiving a second request for a second set of application information from the application running for the user object;
   in response to the second request, determining that an instance of the second set of application information is not in the cache; and
   in response to determining that an instance of the application information is not in the cache, requesting the application information from the information repository.

17. The method of claim 16, wherein the method further comprises the following:
   in response to the second request, receiving the second set of application information back from the information repository;
   in response to receiving the second set of application information back from the information repository, converting the second set of application information from a first format to a second format, the second format being different from the first format;
   storing an instance of the second set of application information in the cache in the second format; and
   passing the second set of application information to the application in the second format.

18. The method of claim 13, wherein, the application information is a first set of application information, the request for application information is a first request for the first set of application information, and the method further comprises the following:
  receiving a second request for a second set of application information from the application running for the user object;
  in response to the second request, determining that an instance of the second set of application information is in the cache;
  in response to determining that the instance of the second set of application information is in the cache, determining that the instance of the second set of application information in the cache has not already been accessed for the user object;
  in response to determining the instance of the second set of application information in the cache has not already been accessed for the user object, determining that the user object is not authorized to access the second set of application information; and
  in response to determining that the user object is not authorized to access the second set of application information, informing the application that the user object is not authorized to access the second set of application information.

19. The method of claim 13, wherein the method further comprises automatically performing a refresh operation comprising:
  determining whether the instance of the application information in the cache is out of date;
  if the instance of the application information in the cache is out of date, then retrieving updated application information from the information repository in a first format, the updated application information being an updated version of the instance of the application information;
  converting the updated application information from the first format to a second format; and
  saving the updated application information in the cache in the second format.

20. The method of claim 19, wherein the refresh operation is performed asynchronously with one or more other operations in the cache.

* * * * *